United States Patent [19]

Okita

[11] Patent Number: 5,050,518

[45] Date of Patent: Sep. 24, 1991

[54] AUTOMATIC STEERING DEVICE

[75] Inventor: Ryozo Okita, Hamamatsu, Japan

[73] Assignee: Sanshin Kogyo Kabushiki Kaisha, Hamamatsu, Japan

[21] Appl. No.: 592,338

[22] Filed: Oct. 1, 1990

Related U.S. Application Data

[63] Continuation of Ser. No. 276,313, Nov. 25, 1988, abandoned.

[30] Foreign Application Priority Data

Nov. 27, 1987 [JP] Japan .................................. 62-297829

[51] Int. Cl.$^5$ .............................................. G06F 15/50
[52] U.S. Cl. ........................... 114/144 A; 114/144 RE; 340/851
[58] Field of Search ........ 114/144 R, 144 RE, 144 A, 114/128; 440/1, 49, 53; 364/424.01, 424.02, 424.05; 340/850, 851, 984–987

[56] References Cited

U.S. PATENT DOCUMENTS

| | | | |
|---|---|---|---|
| 4,542,464 | 9/1985 | Kramer | 114/144 RE |
| 4,759,731 | 7/1988 | Uchida | 440/1 |
| 4,766,834 | 8/1988 | Miyayama | 114/144 E |
| 4,767,363 | 8/1988 | Uchida | 440/1 |

Primary Examiner—Joseph F. Peters, Jr.
Assistant Examiner—Clifford T. Bartz
Attorney, Agent, or Firm—Ernest A. Beutler

[57] ABSTRACT

A ship steering system for automatically maintaining a steering course including a manual steering device and a memory that retains the course setting when the manual steering operation is discontinued for maintaining that set course and thus minimizing abrupt course deviations during automatic control.

4 Claims, 3 Drawing Sheets

AUTOMATIC STEERING DEVICE

This is a continuation U.S. patent application Ser. No. 276,313, filed Nov. 25, 1988, now abandoned.

BACKGROUND OF THE INVENTION

This invention relates to an automatic steering device for a marine vessel and more particularly to an automatic steering device wherein the course can easily be maintained and abrupt alterations in the steering component of the vessel are avoided.

FIG. 1 illustrates a conventional automatic steering device for a watercraft which watercraft is identified generally by the reference numeral 11 and includes a steering device such as a rudder 12. The rudder 12 is operated by a suitable driver circuit 13 which, in turn, is controlled by means of a control system that includes a part of a controller, indicated schematically at 14, a course fixing device 15 by which the operator set the desired course. The vessel 11 is provided with a bow azimuth detector 16 such as a gyro compass or the like and which outputs a signal to a comparator 17 so as to compare the course fixed by the course fixing device 15 with the actual course determined by the azimuth detector 16. This difference signal is outputted to a processor 18 which is controlled by an input 19 so as to provide an output control to a controller 21 which, through a switch 22, controls the steering driver 13 so as to position the rudder 12 and maintain the vessel 11 on the desired course.

FIG. 2 shows the results of the operation of a conventional automatic steering device. As may be seen, the vessel, when travelling from the point O to the point A deviates along the course P, there is a situation when the course deviation reaches a fairly substantial amount as indicated at the dimension x. When this occurs, the steering device 13 will operate the rudder 12 and effect a substantial change in the steering which can cause an abrupt course deviation that can be unsettling to the passengers. This type of situation is very common with this type of device and, obviously, not particularly desirable.

It is, therefore, a principal object of this invention to provide an improved automatic steering device wherein substantial course deviations are not permitted and wherein substantial course modifications are not required.

It is a further object of this invention to provide an improved steering arrangement for a watercraft wherein the steering control of the watercraft is automatically maintained and is preset by means of a device which is simple and insures against large course deviations.

SUMMARY OF THE INVENTION

This invention is adapted to be embodied in a ship steering system that comprises a steering device, manually operated means for steering of the steering device and memory means for retaining a setting of the steering device. Means are incorporated for automatically maintaining the course set by the memory means at the completion of a manual steering operation.

DETAILED DESCRIPTION OF THE PREFERRED EMBODIMENT OF THE INVENTION

Figure 1:
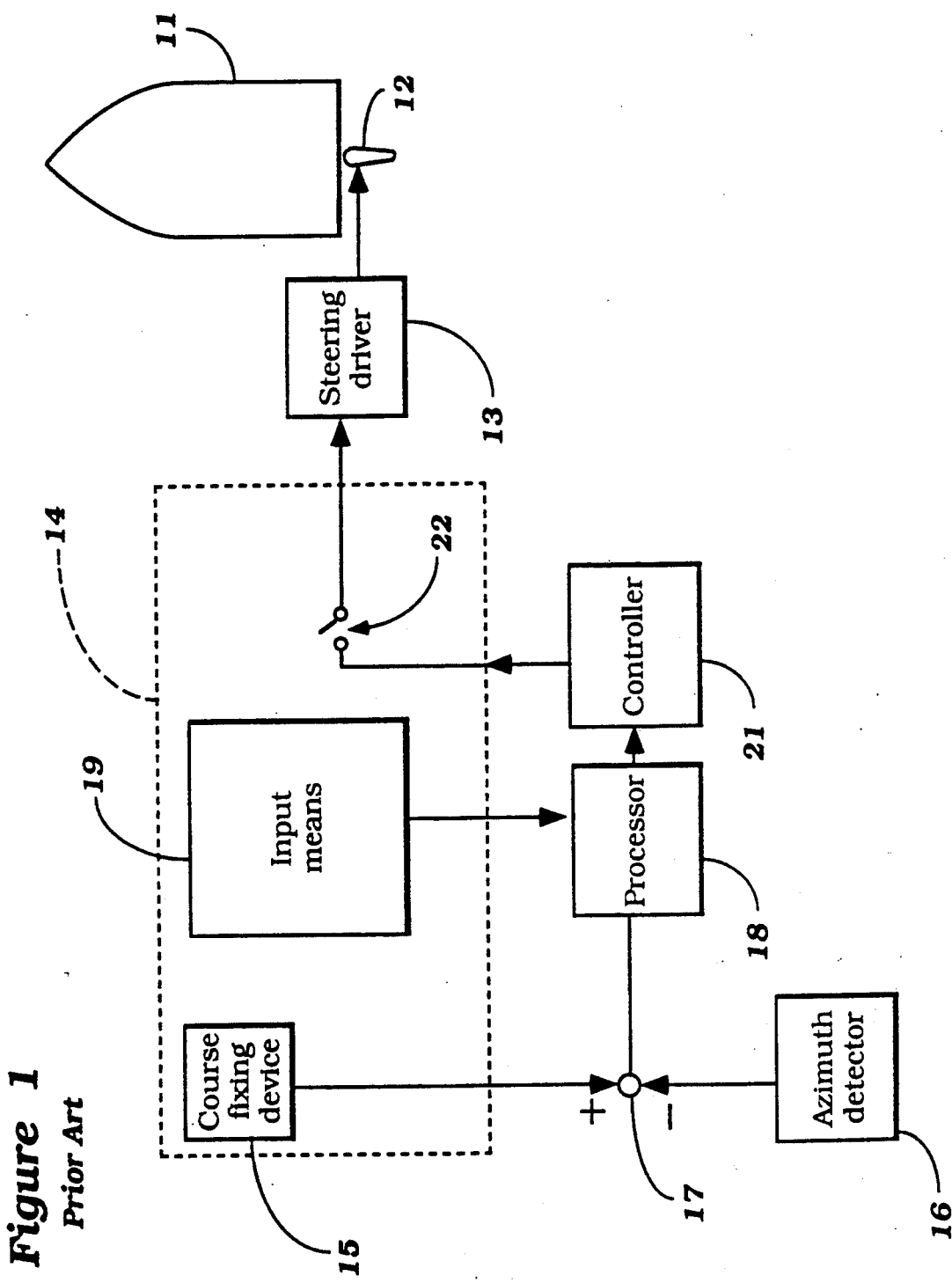
FIG. 1 is a schematic view of an automatic ship steering device constructed in accordance with the prior art.
Figure 2:
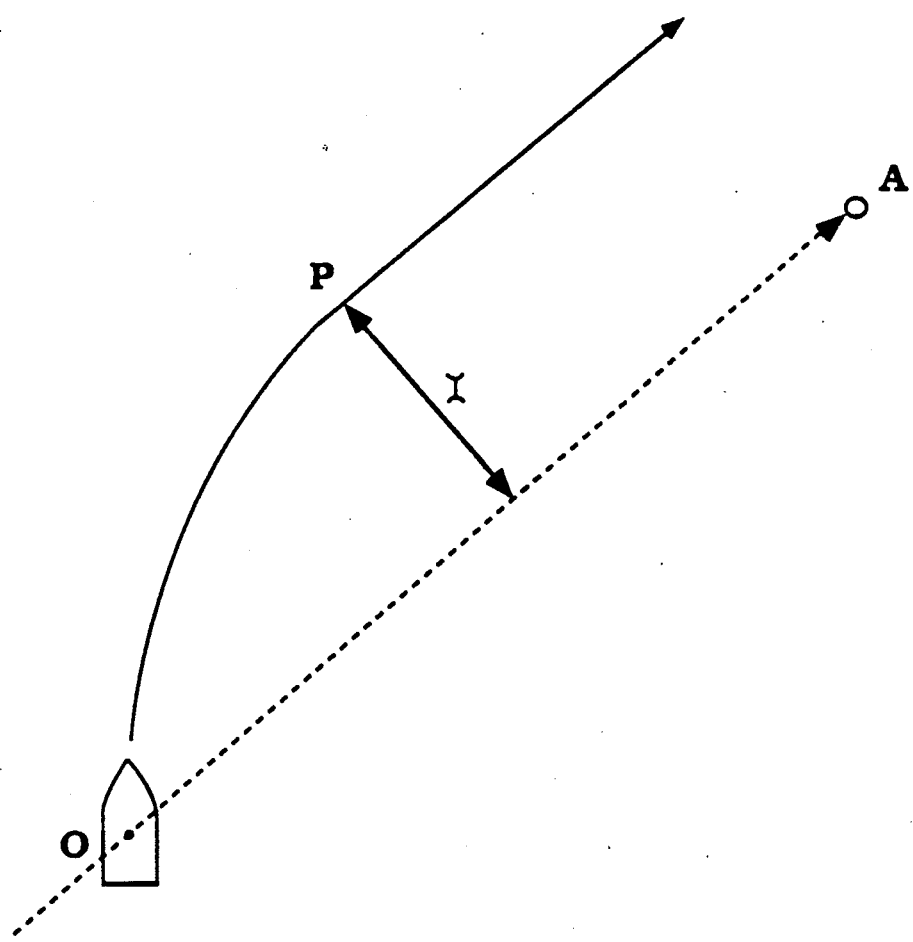
FIG. 2 is a graphical view showing how a conventional automatic steering device operates and the course deviations which may result from it.
Figure 3:
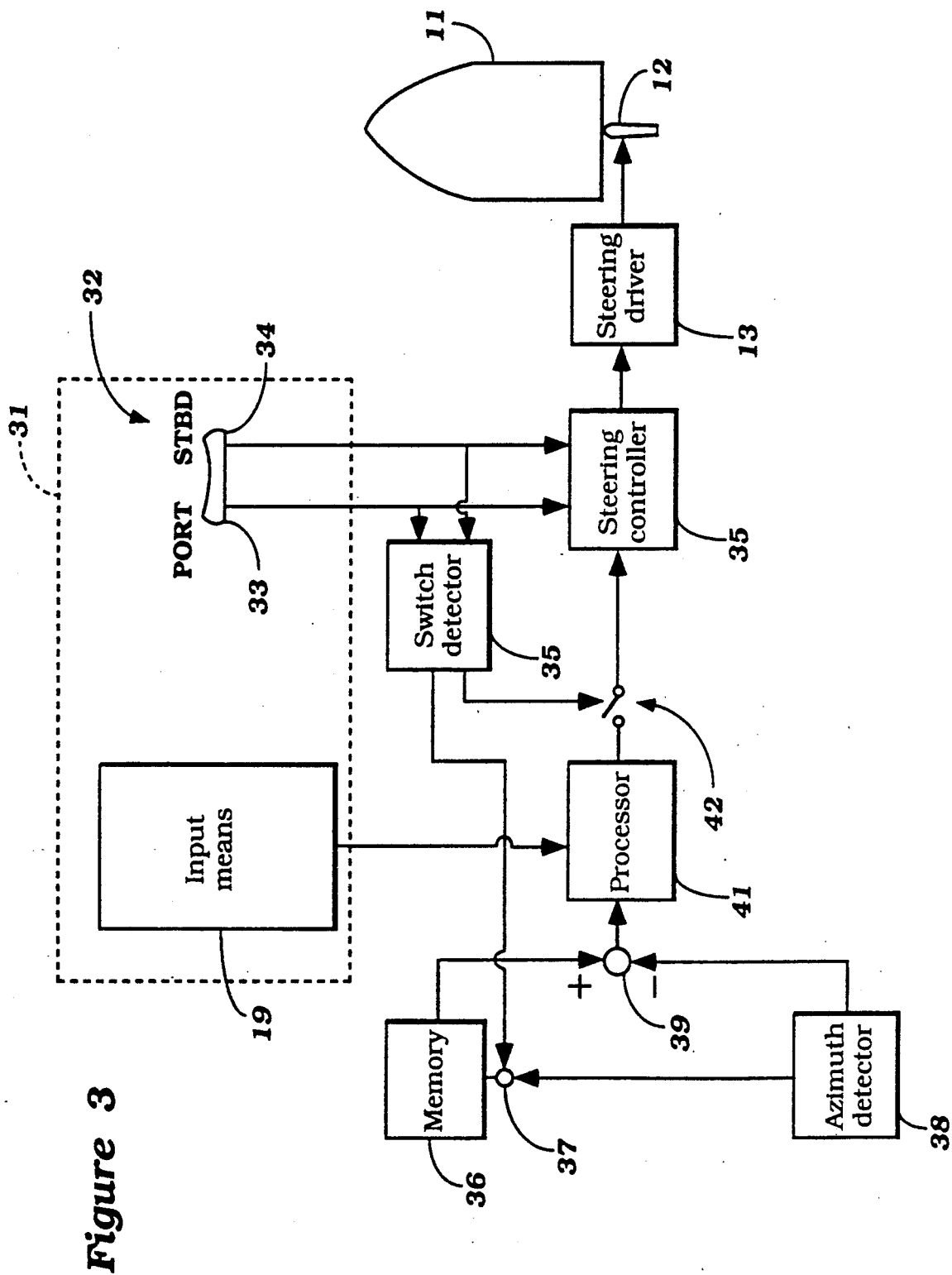
FIG. 3 is a schematic view of an automatic steering device constructed in accordance with an embodiment of the invention.

Referring specifically to FIG. 3, the constuction of the watercraft 11 and its steering rudder 12 and steering driver 13 is the same as the conventional system and thus have been identified by the same reference numerals. In this embodiment, however, the controller 31 includes a manually operated steering switch 32 that is operative between a port steering position 33 or a starboard steering condition 34. These manual steering outputs are transmitted to a steering controller 35 that will operate the steering driver 13 so as to operate the rudder 12 in the directions controlled by the operator.

In this embodiment, the operation of the manual switch 32 also outputs a signal through a switch detector 35A which is transmitted to a memory 36 for memorization. This memorization is transmitted through a memory gate 37. Like the prior art system, there is also provided a bow azimuth detector 38 which also outputs a signal to the memory 36 through the gate 37 as well as a signal to a comparator 39. The comparator 39 outputs a signal, as to be described, to a processor 41 that receives an output from the input device 19 determined by the difference between the desired rudder position and the actual rudder position and which is outputted through a on/off switch 42 to the steering controller 35 under the conditions now to be described.

The way the device operates is that when an operator inputs a manual steering control to the steering device 32, the port or starboard switches 33 or 34 will control the steering driver 13 through the controller 35 to achieve manual control of the rudder 12.

At the same time, the switch detector 35A outputs the signal to the memory 36 through the memory gate 37 so as to indicate that manual steering is accomplished. Immediately upon the discontinuation of the manual steering control, the memory gate 37 transmits the actual bow angle as determined by the azimuth detector 38 to the memory 36 and this value is memorized. As a result, the device indicates the desired steering condition of the watercraft 11 and this then forms the steering input to the comparator 39. Because of this, any course deviations that occur should be very small and these course deviations are determined by comparing the actual azimuth from the detector 38 with the value in the memory 36 by the comparator 39 and outputting this different signal to the processor 41. The processor 41 then operates in the manner previously described so as to control the steering controller 35 through the switch 42 which will now be closed by the switch detector 35 so as to achieve automatic control.

As a result, it should be apparent that the steering adjustments will be relatively minor and abrupt changes in steering will not be required. Also any time the operator wishes to create a manual correction, his operation of the switch 32 will cause the switch detector 35A to open the switch 42 and reset the input to the memory 36 in the manner described. As a result, it should be readily apparent that very good effective automatic steering is achieved and the course azimuth can be easily modified by the operator returning the device to manual control.

The foregoing description is, of course, that of a preferred embodiment of the invention and various changes and modifications may be made without departing from the spirit and scope of the invention as defined by the appended claims.

I claim:

1. A ship steering system comprising a steering device, an automatic course controlling device for operating said steering device to maintain a preset course in response to an input signal, manually operated means for operating said steering device, memory means for memorizing a setting of said steering device upon operation of said manually operated means, and means for inputting the memorized setting of said steering device as the input signal to said automatic course controlling device for automatically maintaining the course set by said memory means at the completion of a manual steering operation of said manually operated means.

2. A ship steering system as set forth in claim 1 wherein the ship includes an azimuth detector and a memory which retains the reading of the azimuth detector at the time of discontinuance of the manual steering operation.

3. A ship steering system as set forth in claim 2 further including switch detecting means for detecting operation of the manually operated means for precluding operation of the steering device by said automatic course controlling device during manual operation and for permitting automatic course operation when the manual operation has discontinued.

4. A ship steering system as set forth in claim 1 further including switch detecting means for detecting operation of the manually operated means for precluding operation of the steering device by said automatic course controlling device during manual operation and for permitting automatic course operation when the manual operation has discontinued.

* * * * *